Figure 1:
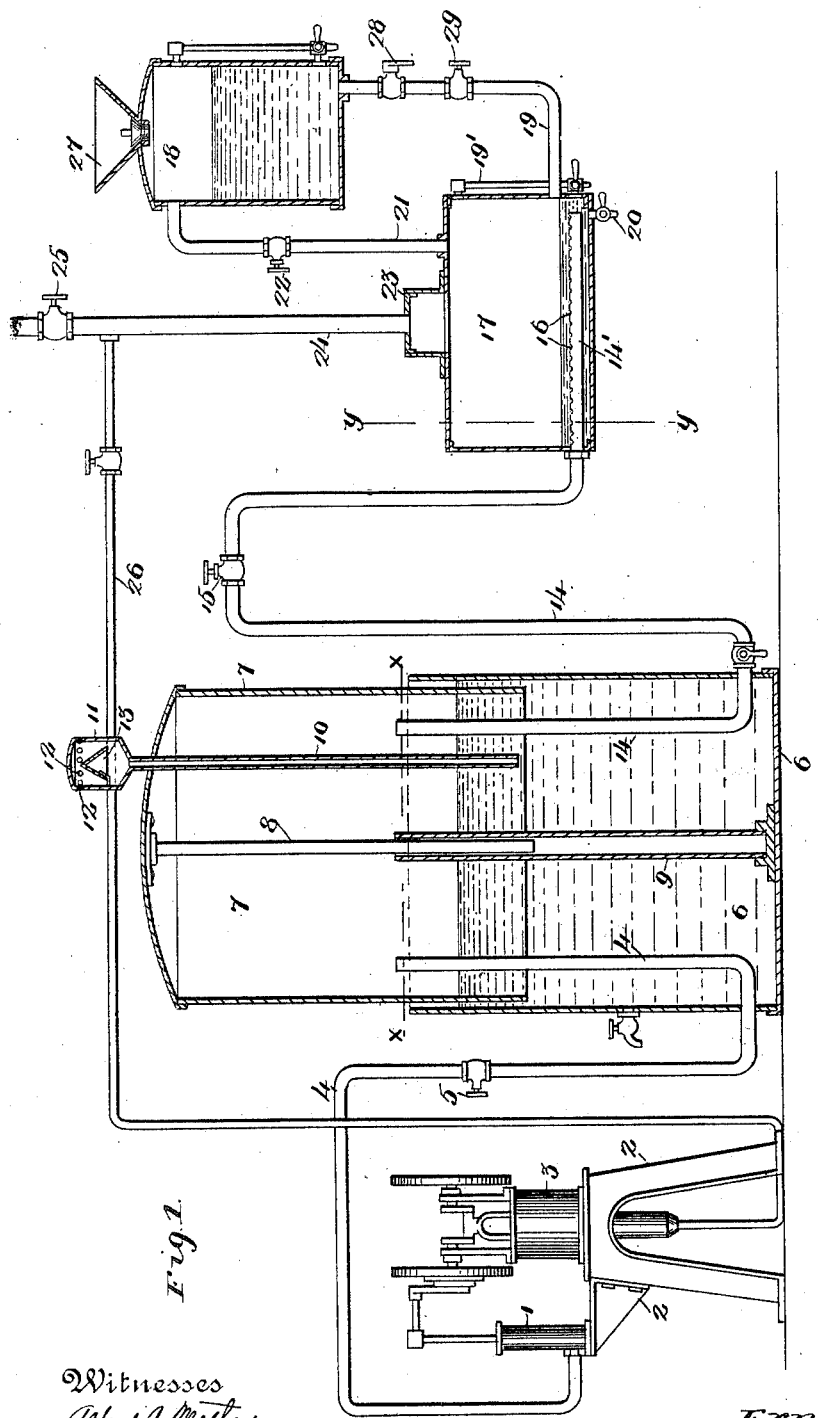

(No Model.) 2 Sheets—Sheet 1.

E. GREY.
APPARATUS FOR MAKING GAS.

No. 600,221. Patented Mar. 8, 1898.

Witnesses
Alfred A. Mathey

Inventor
Ernst Grey
By his Attorneys
Keller & Storer

THE NORRIS PETERS CO., PHOTO-LITHO., WASHINGTON, D. C.

(No Model.) 2 Sheets—Sheet 2.
E. GREY.
APPARATUS FOR MAKING GAS.
No. 600,221. Patented Mar. 8, 1898.
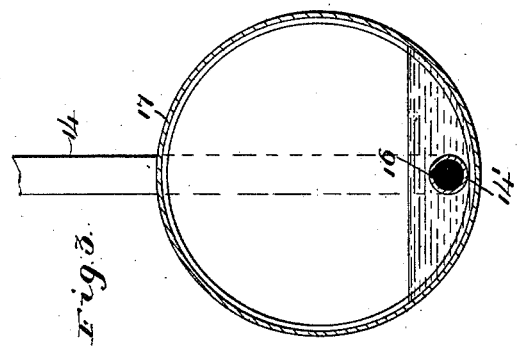
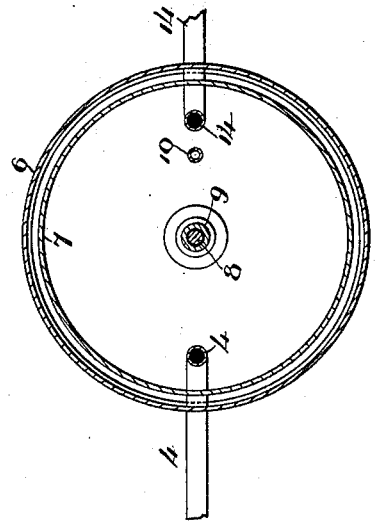
Witnesses
Alfred A. Mithey
M. T. Iwenly
Inventor
Ernst Grey
By his Attorneys
Keller & Storek
THE NORRIS PETERS CO., PHOTO-LITHO., WASHINGTON, D. C.

UNITED STATES PATENT OFFICE.

ERNST GREY, OF ST. LOUIS, MISSOURI, ASSIGNOR OF THREE-FIFTHS TO ROY F. CARTER, OF SAME PLACE.

APPARATUS FOR MAKING GAS.

SPECIFICATION forming part of Letters Patent No. 600,221, dated March 8, 1898.

Application filed April 19, 1897. Serial No. 632,783. (No model.) Patented in England April 18, 1896, No. 8,239, and in Germany April 25, 1896, No. 55,740.

*To all whom it may concern:*

Be it known that I, ERNST GREY, a subject of the Emperor of Germany, residing at St. Louis, State of Missouri, have invented certain new and useful Improvements in Apparatus for the Manufacture of Illuminating-Gas, of which the following is a full, clear, and exact description, reference being had to the accompanying drawings, forming a part thereof, and for which Letters Patent were granted in Great Britain, No. 8,239, April 18, 1896, and in Germany, No. 55,740, April 25, 1896.

My invention has relation to improvements in apparatus for manufacturing illuminating-gas; and it consists in the novel arrangement and combination of parts more fully set forth in the specification and pointed out in the claim.

In the drawings, Figure 1 is a middle vertical sectional elevation of the apparatus, showing the air-pump in elevation. Fig. 2 is a section on line $x$ $x$ of Fig. 1, and Fig. 3 is a section on line $y$ $y$ of Fig. 1.

The object of my invention is to construct an apparatus wherein liquid hydrocarbons can be readily treated in connection with air at ordinary temperatures for purposes of producing illuminating-gas.

In detail the apparatus may be described as follows:

Referring to the drawings, 1 represents an air-pump mounted on a suitable base 2 and operated from any suitable source of energy, but here shown as operated by an explosive-engine 3, fed by the gas generated by the apparatus. Leading from the air-pump is a pipe 4, provided with a valve or cock 5, the said pipe passing through the lower portion of the wall of the water-tank 6 and projecting a suitable distance above the water-level in said tank and into the pneumatic float 7, confined within the peripheral walls of the tank, the said float being provided with an inner depending rod 8, operating within a tube 9, projecting from the base of the tank, whereby the float is guided in its movements within the tank. The float 7 is also provided with an air-escape pipe 10, extending normally to a slight distance below the level of the water in the tank 6 and extending outwardly through the upper wall of the float, the object of said air-pipe being to allow for the escape of the excess of air forced under the float, such escape taking place when the lower edge of the float approaches too near to the surface of the water in the tank. The upper end of the pipe 10 is provided with a chamber 11, having openings 12 in the walls thereof for the escape of the said excess of air, and having a deflector 13 for returning any water to the tank which may be mechanically carried up by the upward rush of air through the pipe 10. Leading also from the tank 6 and disposed similarly to the pipe 4 is a pipe 14, provided with a controlling-valve 15, the free end of the said pipe being provided with a horizontal extension 14', having a series of openings 16 disposed along the upper peripheral wall thereof. The extension 14' is disposed along the base of the inner surface of a receptacle 17, designed to receive from a suitable supply vessel 18 liquid hydrocarbon—such as ligroin, naphtha, and the like—the said hydrocarbon being admitted through a pipe 19, communicating with the bottom and one end of the vessel 18 and receptacle 17, respectively. The receptacle 17 is provided with a gage 19' and drip-valve 20. To equalize the pressure between the vessel 18 and receptacle 17, I establish communication between the upper parts of the interiors of the vessels by a pipe 21, controlled by a valve 22. Leading from a collecting-dome 23 on the upper peripheral wall of the receptacle 17 is a pipe 24, provided with a valve 25, below which there extends a pipe 26 to any suitable burner or burners, (not shown,) or, as in the present case, to the explosive-engine, by which the air-pump 1 is operated. To better introduce the hydrocarbon into the vessel 18, I provide the latter with a funnel 27.

Normally the extension 14' is submerged below the level of the hydrocarbon admitted into the receptacle 17. The air-pump forces the air under the float 7, the weight of the latter causing a constant pressure of air to escape through the openings 16 of the pipe 14', the air thus forced through the openings absorbing the volatile constituents from the liquid hydrocarbon within which the pipe is submerged. The mixture of air and said volatile constituents constitutes the illuminating-gas, which gas is delivered through the pipe 26 to any suitable burner or burners, (not shown,) or, as in the present case, to the motor or to any suitable source of consumption. The various valves shown in connection with the pipes are employed under conditions suggested to the operator. For example, the valve 25 is opened when the operation is at one end to relieve the receptacle 17 of any accumulated gases. I have here shown the pipe 19 provided with valves 28 29, the former being a general valve which may always remain open and the latter a regulating-valve which may to a nicety control the escape of the liquid from the vessel 18 to the receptacle 17.

Having described my invention, what I claim is—

In combination with a carbureting system, a water-tank, a float movable therein, an escape-pipe carried by the float, the lower end thereof being normally closed by the water in the tank, but arising above the water-level on an excess of pressure in the float, a chamber having perforated walls located at the upper end of the said pipe, and a deflector located within the said chamber below the perforations therein to prevent the escape of water through the pipe, substantially as described.

In testimony whereof I affix my signature in presence of two witnesses.

ERNST GREY.

Witnesses:
EMIL STAREK,
ROY F. CARTER.